May 10, 1938.  W. B. RORISON  2,117,104
MEANS FOR DEFROSTING HEAT EXCHANGER SURFACES
Filed Aug. 8, 1934
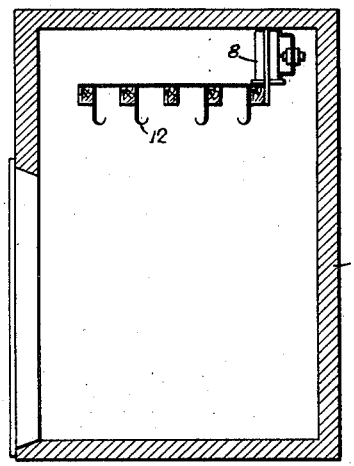
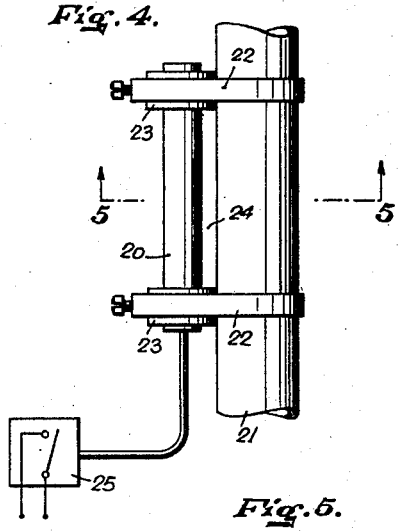
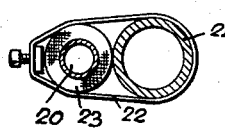
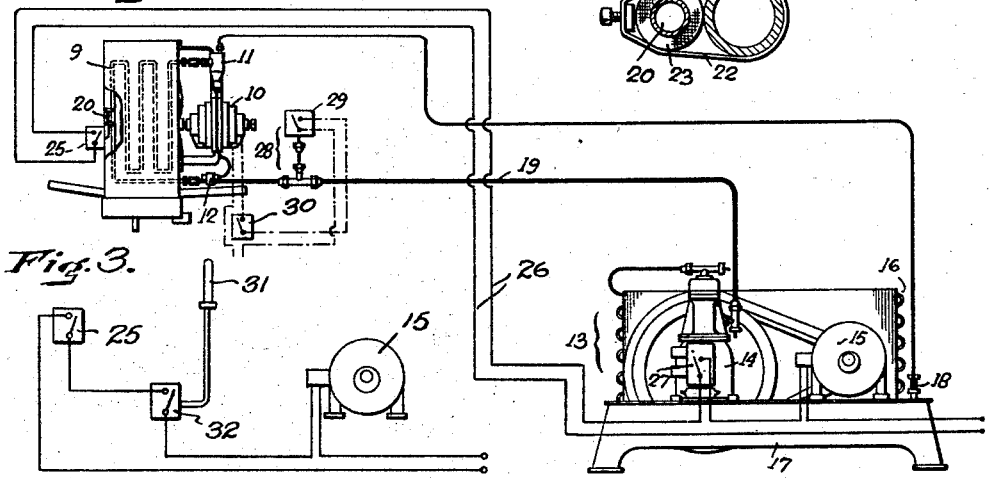
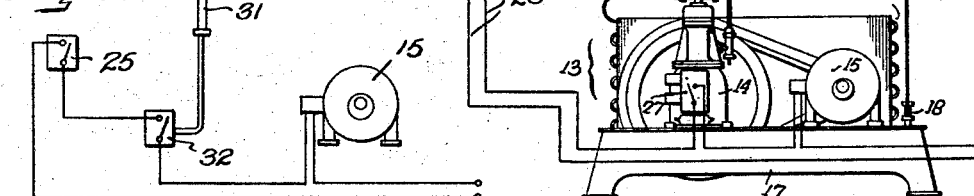
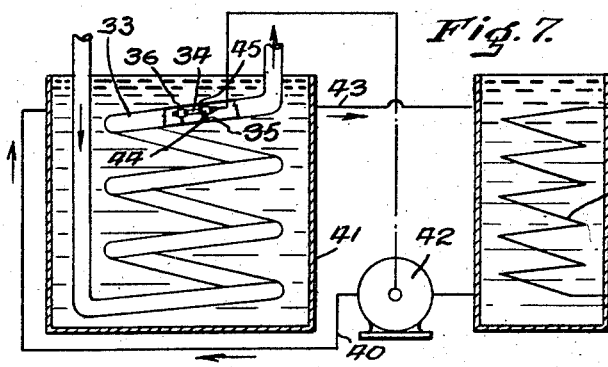
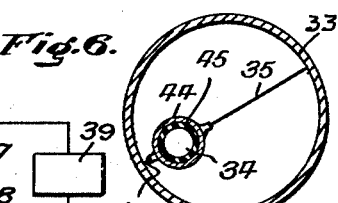
INVENTOR
WILLIAM B. RORISON,
BY Herman Geist
ATTORNEY Patented May 10, 1938

2,117,104

UNITED STATES PATENT OFFICE 2,117,104

MEANS FOR DEFROSTING HEAT EXCHANGER SURFACES

William B. Rorison, Plainfield, N. J., assignor, by mesne assignments, to Carrier Corporation, Newark, N. J., a corporation of Delaware Application August 8, 1934, Serial No. 738,945

1 Claim. (Cl. 62—4)

This invention relates to means for defrosting heat exchanger surfaces responsive to conditions which indicate excessive frosting detrimental to efficient use of the surface.

The general object of the invention is to provide a simple, inexpensive and efficient mechanism for controlling the production of refrigerating effect whereby supply of refrigeration ceases when frosting on heat exchanger surfaces served thereby becomes excessive to the point where efficient heat exchange between a fluid and surfaces through which the fluid circulates, is impaired.

A feature of the invention resides in the provision of a thermal bridge including a thermal bulb adapted to reflect the temperature of refrigerant in the exchanger when a gap between the bulb and the exchanger is completely filled with frost or ice. When the gap is free of frost, the bulb will reflect the higher temperature of the fluid passing through the interchanger, whereas when the frost or ice bridges the gap between the bulb and the exchanger, the bulb will approach the temperature of the refrigerant and thereupon operate to cause the supply of refrigeration to be cut off.

A further feature resides in the provision of a control device operative responsive to changes in temperature of the interchanger or pressure in a refrigerant line, whereby an actuating device such as a motor for driving a refrigerating machine is rendered inoperative when the temperature of the interchanger or pressure in the line drop below predetermined minimums. Thereafter, upon a rise in temperature in the interchanger, or pressure in the line above a predetermined maximum, the control will function to render the actuating device operative.

Another feature resides in the provision of a control arrangement wherein a thermostatic control operative responsive to changes in temperature within a conditioned area is linked with a second control operative responsive to changes in temperature of an interchanger or pressure within a refrigerant line whereby a refrigeration producing device will be primarily governed by the thermostatic control except that when the temperature of the interchanger or pressure in the refrigerant line drop below predetermined minimums, the second control will render the refrigeration producing device inoperative until such time as said temperature or pressure exceeds predetermined maximums, whereupon the refrigeration producing device will become operative and the thermostatic device again assumes control.

Other features for promoting efficiency in the use of heat exchangers subject to frosting of surfaces, and advantages making for simplicity and certainty in an economical arrangement for controlling heat exchanger devices, especially those used in cold diffusion within refrigerators and the like will be more apparent from the following description of one form of applicant's invention, in which:

Fig. 1 is a view, in cross-section, of a refrigerator showing, in diagrammatic form, a conditioning unit adapted to be employed in a system for the preservation of perishable products, in which applicant's invention may be used advantageously.

Fig. 2 is a diagrammatic view of an arrangement illustrating a refrigerating machine in combination with a cold diffuser or heat exchanger unit wherein applicant's invention is employed to prevent excess frosting and to bring about defrosting in the interests of efficient operation free from human supervision;

Fig. 3 is a diagrammatic sketch of a control arrangement wherein a thermostatic control responsive to room temperature conditions in combination with applicant's "defrosting control" are employed for controlling a motor used to drive a refrigerating machine;

Fig. 4 is a detail of applicant's thermal unit attached to but insulated from a heat exchanger tube through which refrigerant is adapted to be circulated;

Fig. 5 is a cross-section of applicant's thermal bridge formed by the thermal element and tube as viewed on the line 5—5 of Fig. 4; and Fig. 6 shows another form of applying applicant's thermal bridge arrangement for preventing undue efficiency losses and damage incident to freezing of fluid circulated through or about tubes of interchanger devices.

Fig. 7 is a diagrammatic sketch of a cooling system employing the form of the invention illustrated in Fig. 6.

Considering the drawing, similar designations referring to similar parts, numeral 7 represents a refrigerator adapted to contain meats, fruits, vegetables and other perishables. Adjacent to ceiling level, or otherwise suitably positioned, is a cold diffuser designated generally by numeral 8. The cold diffuser is a compact unit structure comprising heat exchanger 9, fan and motor 10, expansion valve 11, thermal element 12 for controlling the operation of the expansion valve and various fittings necessary for assuring a compact operable assembly.

In Fig. 1, the cold diffuser is shown mounted for service in a meat cooler containing racks and meat hooks 12. The frame of the refrigerator, or its equipment, for storing or otherwise suitably accommodating produce, forms no part of the invention and is merely shown for illustrative purposes. The Fig. 2 cold diffuser is shown connected to a refrigerating machine generally designated 13, containing the conventional compressor 14, driving motor 15, condenser 16 and receiver 17.

In operation, the cycle will include the usual circulation of refrigerant from receiver 17, through stop valve 18, through expansion valve 11, to the tubes of exchanger 9 and back to the compressor through suction line 19. After the cold diffuser has operated to the point where the accumulation of frost on the tubes reduces heat exchange to an undesirable degree, applicant's defrosting control will operate to stop the further flow of refrigerant to accomplish defrosting.

Referring more particularly to Fig. 4, it will be noted that thermal element 20 is suitably attached to a tube 21, of the heat exchanger by straps or other fastening means 22. The thermal element is insulated from tube 21 by rings of suitable material 23. The thermal element may be supported away from the tube in a number of ways and applicant does not limit himself with respect to the mode of supporting the thermal element. The principal thing is to provide a suitable space relation between the thermal element and tube regardless of the specific manner of positioning the two together. The space 24 normally allows the air or other gaseous fluid, circulated by fan 10, to pass between the thermal element 20 and the attached tube 21. Under such a condition, the temperature of the liquid in element 20, approximates the temperature of the air passing through the interchanger. However, when the accumulation of frost or snow, on the interchanger has advanced to the point where gap 24 is bridged, there will then be substantially a solid mass of frost or ice connecting element 20 and tube 21. The liquid in element 20 will then approximate the temperature of tube 21, which is lower than the temperature of the air.

Switch, or control 25, is arranged to operate responsive to changes in temperature of the liquid in element 20. When the temperature of the liquid drops below a predetermined point, which will be the case when frost fills up gap 24, it will operate to break the electrical circuit including leads 26 and normally closed switch 27 controlling motor 15. As a result, the motor will stop and the circulation of refrigerant cease. While a refrigerating machine is shown, it is apparent that the same method of operation could be pursued if any other source of refrigeration supply were employed. For example: If a supply of cold brine were employed from a storage reservoir with a pump for circulating the brine to the exchanger, the control would, in that case, stop the pump which circulates the brine and accomplish the same result. The control, therefore, is attached accurately to respond to a condition which reflects excess frosting and cut off the supply of refrigerant until defrosting is accomplished. In the arrangement of Fig. 2, the control 25 will again make the circuit when the temperature in the coils rises to a predetermined point before freezing. This will occur after defrosting of the coils has been completely accomplished.

As set forth in copending application Serial Number 738,950, filed August 8, 1934, it will be detrimental to permit a circulation of air to be carried on in those cases where defrosting has been completed and moisture on the tubes substantially completely evaporated. To prevent such air circulation from taking place, it is highly desirable to utilize a fan economizer, generally designated 28, including a control 29 operative responsive to changes in pressure in suction line 19 and making the fan inoperative when the pressure in the line reflects a refrigerant temperature above a desired maximum point.

Switch 30 is a manual safety control for rendering the fan motor inoperative. In Fig. 3, switch 32, under control of thermostatic element 31, is in series with switch 25 (of Figs. 2 and 4) element 31 will be suitably mounted within the conditioned area. For example: Element 31, when mounted in the interior of a refrigerator such as 7 of Fig. 1, will reflect the temperature within the conditioned area. When the temperature rises above the desired point, switch 32 will close and since switch 25 will normally be closed except during the relatively short intervals when defrosting is required, the circuit of Fig. 3 for motor 15 will be completed.

As already pointed out, motor 15 may be used for operating a refrigerating machine or for supplying refrigerant from any desired source. When defrosting is required, switch 25 will assume control and break the circuit in the manner hereinbefore described until defrosting is completed. It will then again close whereupon the circuit will be completed and again be under the control of switch 32 operative responsive to the thermostatic element 31.

Fig. 6 shows another form of utilizing applicant's thermal bridge operation. Tube 33 contains thermal element 34 suitably positioned therein by a bracket 35. The element is arranged in spaced relation to the tube so that a desired gap 36 will be formed between the element and surface of the tube. Assuming that refrigerant in this case passing around the tube caused the fluid in the tube to freeze, then when the ice bridges gap 36, the thermal element 34 would reflect the temperature of the surface of the tube which would be below freezing and cause further circulation of refrigerant to cease. When the ice has substantially completely melted, thermal element 34 will again reflect the temperature of the fluid in tube 33 and allow refrigerant to again be circulated. The manner of control would be analogous to that described in connection with switch 25 of Figs. 2 and 4.

Fig. 7 illustrates diagrammatically a cooling system utilizing this arrangement. Brine or any other medium having a suitably low freezing point is cooled in tank 37 by the expansion coil 38, connected to conventional refrigerating machinery, designated 39, including a compressor, condenser, receiver, and expansion valve. The cooled brine is forced through line 40 to the tank 41 by pump 42. Brine passing from tank 41 is returned to tank 37 by line 43. Within the tank 41 is a cooling coil comprising the spiralled tube 33, through which the water to be cooled is circulated. Thermal element 34 is positioned within the tube 33, supported by brackets 35 and straps 44, from which it is insulated by insulating bands 45. Thermal element 34 controls the operation of pump 42, interrupting the circulation of refrigerant by the pump whenever the temperature of the thermal element falls below a predetermined value.

In other words, applicant's gap arrangement may be utilized not only on the outer surface of the tube but with equal effect within a tube to reflect freezing temperatures when the freezing has developed to the point where efficient heat exchange is interfered with or where damage due to freezing may possibly result unless circulation of refrigerant is halted.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

I claim:

In a system of the character described, a heat exchange tube, a thermal element within said tube and thermally insulated therefrom, said element being positioned relatively close to but spaced from the inner surface of said tube, means for circulating a refrigerant in heat exchange relation with the external surface of said tube, and means including said thermal element for controlling the circulation of refrigerant responsive to the accumulation of ice within the tube to a predetermined thickness.

WILLIAM B. RORISON.